US012722263B2

(12) United States Patent
Chen et al.

(10) Patent No.: US 12,722,263 B2
(45) Date of Patent: Sep. 1, 2026

(54) PULLER FOR SPRING CONNECTION OF TRAMPOLINE

(71) Applicant: BESTWAY INFLATABLES & MATERIAL CORP., Shanghai (CN)

(72) Inventors: Xiaobo Chen, Jinhua City (CN); Fengwang Chen, Jinhua City (CN); Yanping Wu, Jinhua City (CN); Chunqi Jiang, Jinhua City (CN); Garrett Neubauer, Peoria, AZ (US)

(73) Assignee: BESTWAY INFLATABLES & MATERIAL CORP., Shanghai (CN)

( * ) Notice: Subject to any disclaimer, the term of this patent is extended or adjusted under 35 U.S.C. 154(b) by 201 days.

(21) Appl. No.: 18/377,531

(22) Filed: Oct. 6, 2023

(65) Prior Publication Data

US 2024/0342885 A1 Oct. 17, 2024

(30) Foreign Application Priority Data

Apr. 11, 2023 (CN) ......................... 202320825708.5

(51) Int. Cl.
*B25B 27/30* (2006.01)
*A63B 5/11* (2006.01)

(52) U.S. Cl.
CPC ................. *B25B 27/30* (2013.01); *A63B 5/11* (2013.01)

(58) Field of Classification Search
CPC ...................................................... B25B 27/30
See application file for complete search history.

(56) References Cited

U.S. PATENT DOCUMENTS

| | | | | |
|---|---|---|---|---|
| 2,441,696 | A | 5/1948 | Feingold | |
| 2,666,256 | A | 1/1954 | White | |
| 2,673,392 | A * | 3/1954 | Mcfadden | A47C 23/00 29/227 |
| 4,976,022 | A | 12/1990 | Thornton | |
| 5,371,936 | A | 12/1994 | Blanchard | |
| 7,032,280 | B1 * | 4/2006 | Ploeger | B25B 27/30 29/256 |
| RE44,675 | E * | 12/2013 | Hawkins | B25B 13/56 81/177.4 |
| 8,707,533 | B2 | 4/2014 | Livingston et al. | |
| 2007/0012141 | A1 * | 1/2007 | Huang | B25B 17/00 81/57.29 |
| 2019/0337140 | A1 * | 11/2019 | Shanklin | B25B 23/0021 |
| 2020/0047320 | A1 * | 2/2020 | Luangphon | B25B 27/306 |

OTHER PUBLICATIONS

Extended European Search Report dated Mar. 22, 2024 (Mar. 22, 2024), 6 pages, issued on related European Patent Application 23203245.8 by the European Patent Office.

* cited by examiner

*Primary Examiner* — Sarang Afzali
(74) *Attorney, Agent, or Firm* — Dickinson Wright PLLC

(57) ABSTRACT

A puller for spring connection of a trampoline is provided. The puller includes a pull rod having an extension section and a force fulcrum connected to the pull rod such that a positioning recess is formed between the force fulcrum and the pull rod. A hook having a rear end is connected to the extension section of the pull rod and a front end having a hook head attaches to a spring thereby, enabling the spring to be connected to a tube ring of the trampoline.

10 Claims, 2 Drawing Sheets

PULLER FOR SPRING CONNECTION OF TRAMPOLINE

CROSS-REFERENCE TO RELATED APPLICATION

This application claims priority from Chinese Application CN202320825708.5, filed Apr. 11, 2023 in China, the disclosure of which is incorporated herein by reference in its entirety.

BACKGROUND

1. Field

Example embodiments relate to trampoline installation technology, and more particularly to a puller for spring connection of a trampoline.

2. Description of Related Art

At present, springs need to be installed during installation of a trampoline, and a ring of springs are provided on the trampoline. For assembling, firstly, a ring of several positioning springs are installed, and then the remaining springs are installed. During the assembly process, there is a non-uniform distribution of springs in a circumferential direction, with more springs on one side and less springs on the other side. It is more difficult to install the springs on the side with less springs, making the installation process not only laborious but also have potential safety hazards.

SUMMARY

Example embodiments may address at least the above problems and/or disadvantages and other disadvantages not described above. Also, example embodiments are not required to overcome the disadvantages described above, and may not overcome any of the problems described above.

According to an example aspect of an example embodiment, a puller for spring connection of a trampoline is provided comprising: a pull rod; a force fulcrum connected to the pull rod thereby forming a positioning recess between the force fulcrum and the pull rod; and a hook comprising a rear end connected to the pull rod and a front end comprising a hook head configured to attach to a spring.

A first distance between a front end of the force fulcrum and a rear end of the pull rod may be greater than a second distance between the front end of the force fulcrum and a position at which the hook is connected to the pull rod.

The force fulcrum may comprise an arc-shaped fitting surface.

The puller may further comprise a connecting seat connected to the pull rod, wherein the rear end of the hook is connected to the connecting seat.

The connecting seat may comprise a connecting slot formed therein, and the puller may further comprise a pin shaft disposed in the connecting slot, wherein the rear end of the hook comprises a connecting loop bent around the pin shaft.

The force fulcrum, the connecting seat, and the pull rod may be, together, an integrated structure.

The pull rod may comprise a wrench socket hole formed through a rear end thereof, the wrench socket hole configured to removeably attach to a screw and a nut.

The pull rod may comprise a support section, an extension section, and a connection section angled between the support section and the extension section, and the force fulcrum may be connected to the connection section, and the hook is connected to the extension section.

BRIEF DESCRIPTION OF THE DRAWINGS

The above and/or other aspects will become apparent and more readily appreciated from the following description of example embodiments, taken in conjunction with the accompanying drawings, in which.

DETAILED DESCRIPTION

Figure 1:
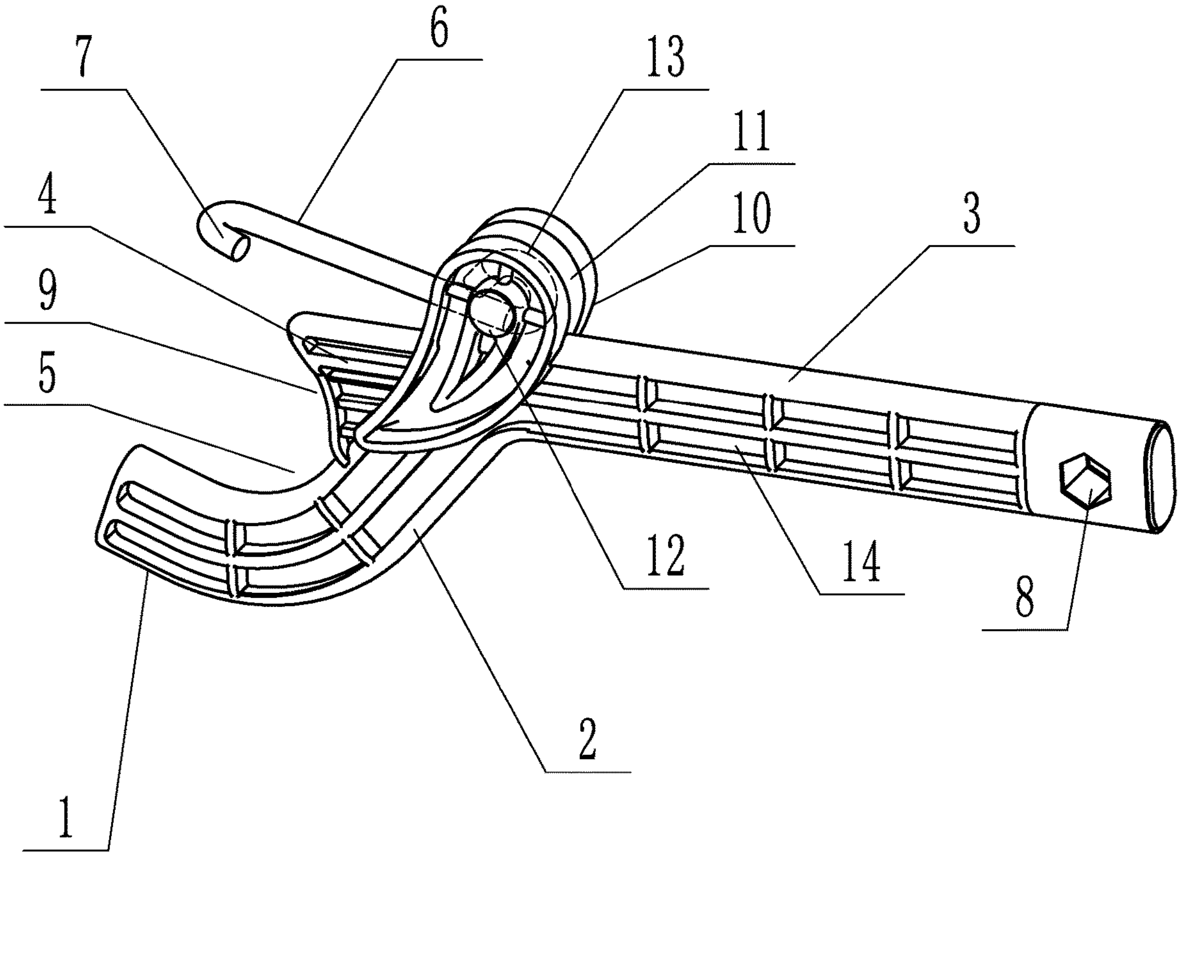
FIG. 1 is a schematic structure diagram of an example embodiment.

Reference will now be made in detail to example embodiments which are illustrated in the accompanying drawings, wherein like reference numerals refer to like elements throughout. In this regard, the example embodiments may have different forms and may not be construed as being limited to the descriptions set forth herein.

It will be understood that the terms “include,” “including”, “comprise, and/or “comprising,” when used in this specification, specify the presence of stated features, integers, steps, operations, elements, and/or components, but do not preclude the presence or addition of one or more other features, integers, steps, operations, elements, components, and/or groups thereof.

It will be further understood that, although the terms “first,” “second,” “third,” etc., may be used herein to describe various elements, components, regions, layers and/or sections, these elements, components, regions, layers and/or sections may not be limited by these terms. These terms are only used to distinguish one element, component, region, layer or section from another element, component, region, layer or section.

As used herein, the term “and/or” includes any and all combinations of one or more of the associated listed items. Expressions such as “at least one of,” when preceding a list of elements, modify the entire list of elements and do not modify the individual elements of the list.

Various terms are used to refer to particular system components. Different companies may refer to a component by different names—this document does not intend to distinguish between components that differ in name but not function.

Matters of these example embodiments that are obvious to those of ordinary skill in the technical field to which these example embodiments pertain may not be described here in detail.

Figure 2:
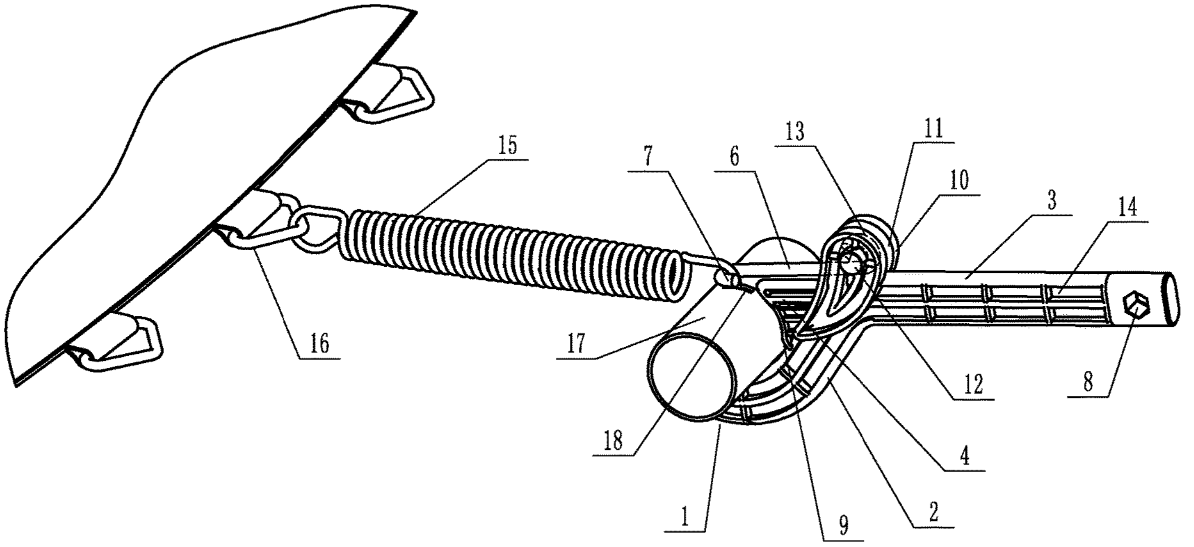
FIG. 2 is a schematic structure diagram of an example embodiment in use.

FIGS. 1 and 2 illustrate a puller for a spring connection of a trampoline including a pull rod. For purposes of description herein, a front direction is defined as a direction to the left in FIG. 1, and a rear direction is defined as a direction to the right in FIG. 1. The pull rod includes a support section 1, a connection section 2, and an extension section 3, where the connection section 2 is angled between the support section 1 and the extension section 3, and there is a rounded transition between the support section 1 and the connection section 2 and between the connection section 2 and the extension section 3. A positioning block 4 is connected to the pull rod as a force fulcrum, and a positioning recess 5 is formed between the positioning block 4 and the pull rod. A rear end of a hook 6 is connected to the pull rod and a front end of the hook is provided with a hook head 7 for attachment to a spring. The front end of the hook 6 is bent to form the hook head 7.

The positioning block 4 is connected to the connection section 2, and the hook 6 is connected to the extension section 3 at a position adjacent to the connection between the connection section 2 and the extension section 3. A first distance between a front end of the positioning block 4 and a rear end of the pull rod, at the rear end of the extension section 3 is greater than a second distance between the front end of the positioning block 4 and the position at which the hook 6 is connected to the extension section 3. A wrench socket hole 8 configured for a screw and a nut to be mounted thereto and removed therefrom, is provided at a rear portion of the extension section 3, and is of a regular hexagonal structure. The positioning block 4 is provided with an arc-shaped fitting surface 9 at a front end thereof. A length of the support section 1 is defined as a length from a front end of the support section 1 to a rear end of the support section 1 at the position at which the support section 1 meets the connection section 2. A length of the extension section 3 is defined as a length from a front end of the extension section 3 at the position at which the connection section 2 meets the extension section 3, to the rear end of the extension section 3. Thus, as shown in FIG. 1, the length of the support section 1 is smaller than the length of the extension section 3. A positioning recess 5 is disposed between the support section 1 and the positioning block 4.

A connecting seat 10 is provided on the pull rod, and a rear end of the hook 6 is connected to the connecting seat 10 at the rear end. A U-shaped connecting slot 11 is provided in the connecting seat; a pin shaft 12 is installed in the connecting slot 11; and the rear end of the hook 6 is bent to form a connecting loop 13. The connecting loop 13 is sleeved around the pin shaft 12 and is installed in an installing groove. The positioning block 4, the connecting seat 10, and the pull rod form an integrated structure. Weight-reducing slots 14 are provided in at least one of two side surfaces of at least one of the positioning block 4, the connecting seat 10, and the pull rod.

With reference to FIG. 2, according to an example embodiment, for installing a spring on a trampoline, a front end of a spring 15 is attached to a buckle 16 (e.g., a triangular buckle), and the positioning recess 5 is positioned to be in engagement with a tube ring 17 of the trampoline. The hook head 7 at the front end of the hook 6 is hooked onto a rear end of the spring 15. The pull rod is pressed (e.g. in a downward direction), and the positioning block 4 is supported on the tube ring 17 as a force fulcrum, such that the hook 6 is pulled rearward by virtue of the principle of a lever, thereby pulling the spring 15 rearward to enable the spring 15 to be hooked into a connecting hole 18 in the tube ring 17. The positioning recess 15 is engaged with the tube ring 17 and is difficult to separate from the tube ring 17 during operations, thus avoiding potential safety hazards caused by the spring 15 being unable to be further extended and rebounding forcefully midway. After the spring 15 is installed in place, the pull rod is moved in a rearward direction to separate the hook head 7 from the spring 15, and the entire device may be removed from the tube ring 17. Thus, according to one or more example embodiments described herein, a puller for spring connection of a trampoline may facilitate the installation of springs on the trampoline, may allow springs to be installed with less effort and may contribute to increasing the speed of assembly of the trampoline. During spring installation, it may thus be possible to avoid potential safety hazards caused by springs being unable to be further extended and rebounding forcefully midway.

It may be understood that the example embodiments described herein may be considered in a descriptive sense only and not for purposes of limitation. Descriptions of features or aspects within each example embodiment may be considered as available for other similar features or aspects in other example embodiments.

While example embodiments have been described with reference to the figures, it will be understood by those of ordinary skill in the art that various changes in form and details may be made therein without departing from the spirit and scope as defined by the following claims.

What is claimed is:

1. A puller for spring connection of a trampoline, the puller comprising:
- a pull rod comprising:
  - a support section;
  - an extension section;
  - a connection section angled between the support section and the extension section;
  - a plurality of rounded transitions, such that at least one rounded transition is formed between the support section and the connection section and at least one rounded transition is formed between the connection section and the extension section;
- a force fulcrum connected to the pull rod thereby forming a positioning recess between the force fulcrum and the pull rod,
- wherein the force fulcrum comprises a position block having an arc-shaped fitting surface connected to a front end of the extension section,
- wherein the position recess is disposed between the support section and the positioning block; and
- a hook comprising a rear end connected to the pull rod and a front end comprising a hook head configured to attach to a spring, thereby enabling the spring to be connected to a tube ring of the trampoline.

2. The puller according to claim 1, further comprising a connecting seat connected to the pull rod, wherein the rear end of the hook is connected to the connecting seat.

3. The puller according to claim 2,
- wherein the connecting seat comprises a connecting slot formed therein, and
- the puller further comprises a pin shaft disposed in the connecting slot, wherein the rear end of the hook comprises a connecting loop bent around the pin shaft.

4. The puller according to claim 2, wherein the force fulcrum, the connecting seat, and the pull rod are, together, an integrated structure.

5. The puller according to claim 1, wherein a first distance between a front end of the force fulcrum and a rear end of the pull rod is greater than a second distance between the front end of the force fulcrum and a position at which the hook is connected to the pull rod.

6. The puller according to claim 1, wherein the pull rod comprises a wrench socket hole formed through a rear end thereof, the wrench socket hole configured to removably attach to a screw and a nut.

7. The puller according to claim 1, wherein the force fulcrum is connected to the connection section, and the hook is connected to the extension section.

8. The puller according to claim 1, wherein the positioning block is connected to the connection section.

9. The puller according to claim 1, wherein the hook is connected to the extension section at a position adjacent to a connection between the connection section and the extension section.

10. The puller according to claim 1, wherein a length of the support section is smaller than a length of the extension section.

* * * * *